United States Patent
Dumais

(10) Patent No.: US 9,746,617 B2
(45) Date of Patent: Aug. 29, 2017

(54) OPTICAL SWITCHES WITH SURFACE GRATING COUPLERS AND EDGE COUPLERS

(71) Applicant: Huawei Technologies Co., Ltd., Shenzhen (CN)

(72) Inventor: Patrick Dumais, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 57 days.

(21) Appl. No.: 14/793,401

(22) Filed: Jul. 7, 2015

(65) Prior Publication Data

US 2017/0010414 A1 Jan. 12, 2017

(51) Int. Cl.
*G02B 6/35* (2006.01)
*G02B 6/124* (2006.01)
(Continued)

(52) U.S. Cl.
CPC .......... *G02B 6/3542* (2013.01); *G02B 6/124* (2013.01); *G02B 6/30* (2013.01); *G02B 6/305* (2013.01);
(Continued)

(58) Field of Classification Search
CPC ... G02B 6/28; G02B 6/34; G02B 6/43; G02B 6/12004; G02B 6/124; G02B 6/126; G02B 6/136; G02B 6/2793; G02B 6/305; G02B 6/3544; G02B 6/30; G02B 6/354; G02B 6/3542; G02B 6/3556; G02B 6/3594; H04Q 11/0005; H04Q 11/0062
(Continued)

(56) References Cited

U.S. PATENT DOCUMENTS

2002/0067882 A1* 6/2002 Guilfoyle .............. G02B 6/43
385/24
2003/0235370 A1 12/2003 Taillaert et al.
(Continued)

FOREIGN PATENT DOCUMENTS

CN 101655576 A 2/2010
CN 102656494 A 9/2012

OTHER PUBLICATIONS

Earnshaw, et al., "8×8 Optical Switch Matrix Using Generalized Mach-Zehnder Interferometers," IEEE Photonics Technology Letters, vol. 15, No. 6, Jun. 2003, pp. 810-812.
(Continued)

*Primary Examiner* — Akm Enayet Ullah
*Assistant Examiner* — Michael Mooney
(74) *Attorney, Agent, or Firm* — Conley Rose, P.C.

(57) ABSTRACT

A photonic integrated circuit (PIC) comprises an optical switch, a plurality of input edge couplers comprising a first input edge coupler and coupled to the optical switch, a plurality of input surface grating couplers (SGCs) comprising a first input SGC and coupled to the optical switch, a plurality of output edge couplers comprising a first output edge coupler and coupled to the optical switch, and a plurality of output SGCs comprising a first output SGC and coupled to the optical switch. A method of fabricating a PIC comprises patterning and etching a silicon substrate to produce a first optical switch, a first surface grating coupler (SGC) coupled to the first optical switch, and a first edge coupler coupled to the first optical switch.

20 Claims, 7 Drawing Sheets

(51) Int. Cl.
*G02B 6/27* (2006.01)
*G02B 6/126* (2006.01)
*G02B 6/34* (2006.01)
*G02B 6/30* (2006.01)
*G02B 6/136* (2006.01)

(52) U.S. Cl.
CPC ............... *G02B 6/34* (2013.01); *G02B 6/354* (2013.01); *G02B 6/3556* (2013.01); *G02B 6/3594* (2013.01); *G02B 6/126* (2013.01); *G02B 6/136* (2013.01); *G02B 6/2793* (2013.01)

(58) Field of Classification Search
USPC .......................................... 385/14–24, 37, 49
See application file for complete search history.

(56) References Cited

U.S. PATENT DOCUMENTS

| | | | |
|---|---|---|---|
| 2011/0103743 A1 | 5/2011 | Baets et al. | |
| 2011/0150386 A1 | 6/2011 | Dupuis et al. | |
| 2014/0064659 A1* | 3/2014 | Doerr | G02B 6/428 385/14 |
| 2014/0153873 A1* | 6/2014 | Kang | G02B 6/34 385/37 |
| 2014/0308004 A1 | 10/2014 | Doany et al. | |
| 2015/0117817 A1* | 4/2015 | Chen | G02B 27/4233 385/37 |

OTHER PUBLICATIONS

DasMahapatra, et al., "Optical Crosspoint Matrix Using Broadband Resonant Switches," IEEE Journal of Selected Topics in Quantum Electronics, vol. 20, No. 4, Jul./Aug. 2014, 10 pages.

Suzuki, et al., "Ultra-compact 8×8 strictly-non-blocking Si-wire PILOSS switch," Optics Express, vol. 22, No. 4, Feb. 12, 2014, pp. 3887-3894.

Foreign Communication From a Counterpart Application, PCT Application No. PCT/CN2016/088593, International Search Report dated Oct. 10, 2016, 5 pages.

* cited by examiner

US 9,746,617 B2

OPTICAL SWITCHES WITH SURFACE GRATING COUPLERS AND EDGE COUPLERS

BACKGROUND

Unlike electronic integrated circuits, which are typically based on silicon materials, photonic integrated circuits (PICs) may be based on many different types of materials such as lithium niobate ($LiNbO_3$), silica on silicon, silicon on insulator (SOI), gallium arsenide (GaAs), and indium phosphide (InP). In addition, PICs consume less power than electronic integrated circuits, and have other advantages as well. PICs typically include optical switches, which enable lights or optical signals to be selectively switched from one optical component to another. Switching refers to moving a signal from an input to an output through a variable path. The variable path may be chosen based on speed and other metrics. PICs also typically include other optical components, including optical couplers that couple optical signals from the optical switches to the other optical components.

SUMMARY

In one embodiment, the disclosure includes a PIC comprising an optical switch, a plurality of input edge couplers comprising a first input edge coupler and coupled to the optical switch, a plurality of input surface grating couplers (SGCs) comprising a first input SGC and coupled to the optical switch, a plurality of output edge couplers comprising a first output edge coupler and coupled to the optical switch, and a plurality of output SGCs comprising a first output SGC and coupled to the optical switch.

In another embodiment, the disclosure includes an apparatus comprising a plurality of input edge couplers, a plurality of input SGCs, a first optical switch coupled to the input edge couplers and the input SGCs and configured to receive from the input edge couplers and the input SGCs first components of input optical signals, and a second optical switch coupled to the input edge couplers and the input SGCs and configured to receive from the input edge couplers and the input SGCs second components of the input optical signals.

In yet another embodiment, the disclosure includes a method of fabricating a photonic integrated circuit (PIC), the method comprising patterning and etching a silicon substrate to produce a first optical switch, a first SGC coupled to the first optical switch, and a first edge coupler coupled to the first optical switch.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
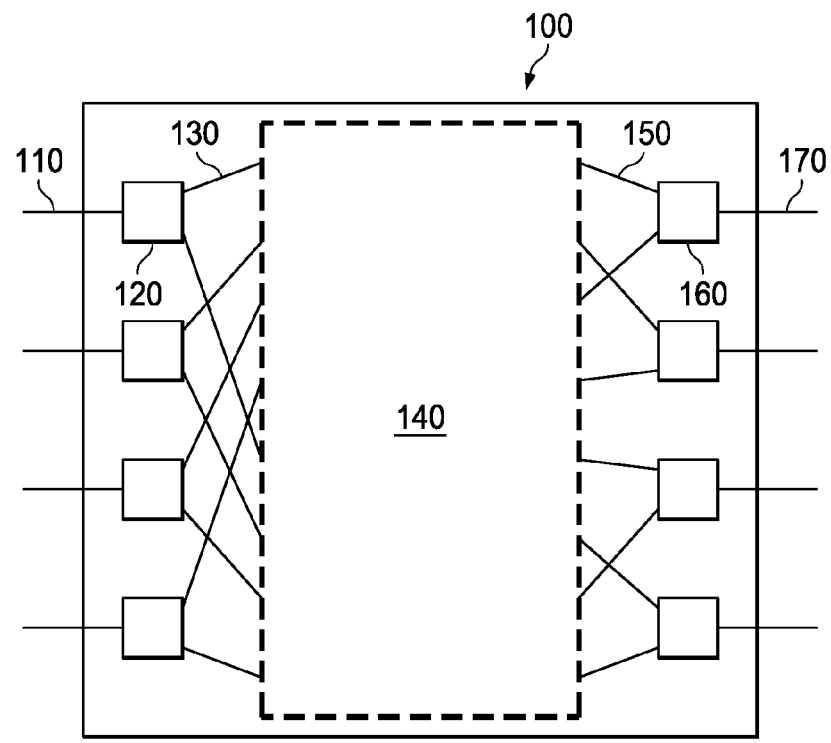
FIG. 1 is a schematic diagram of an optical switch.

It should be understood at the outset that, although an illustrative implementation of one or more embodiments are provided below, the disclosed systems and/or methods may be implemented using any number of techniques, whether currently known or later developed. The disclosure should in no way be limited to the illustrative implementations, drawings, and techniques illustrated below, including the designs and implementations illustrated and described herein, but may be modified within the scope of the appended claims along with their full scope of equivalent.

Optical switches may be complex and may occupy a significant portion of a PIC wafer. A failure of a single component of an optical switch may cause the entire optical switch to fail. Defective optical switches increase fabrication costs. Current process control monitors do not allow detection of defective points in optical switches. Optical couplers couple optical switches to testing components, including silicon waveguides. An edge coupler, which is a type of optical coupler, provides good optical coupling because it provides low optical loss and polarization dependence. Polarization dependence means that optical signals with different polarizations perform differently in terms of coupling loss and other metrics based on the different polarizations. Polarization independence is a desirable characteristic, particularly for fibers that do not maintain a specific polarization and therefore have input optical signals with unknown polarizations. However, edge couplers may be formed only at the end of PIC fabrication when a wafer is divided into separate PICs, or dice. Accordingly, there is a need to detect defective optical switches before the end of PIC fabrication.

Disclosed herein are embodiments for improved PICs and optical switches, including dilated optical switches. Specifically, the disclosed embodiments provide for testing of optical switches during fabrication using SGCs, which may be formed before the end of PIC fabrication. Specifically, optical switches with SGCs may be tested as soon as the SGCs are etched on a wafer, which is typically early in the fabrication process, particularly when the wafer includes active components that require many subsequent operations of masking, etching, doping, and growth. The SGCs may be SPSGCs or PSSGCs depending on polarization characteristics of optical signals. By testing optical switches during fabrication, defective optical switches may be discovered before completing fabrication, thus reducing fabrication costs. In addition, the disclosed embodiments provide for testing of optical switches at the end of, or after, fabrication using edge couplers. Edge couplers may perform better than SGCs in terms of efficiency and bandwidth. By testing optical switches at the end of, or after, fabrication, defective optical switches may be discovered before customers receive them, thus improving customer satisfaction. Furthermore, by providing both SGCs and edge couplers, the disclosed embodiments allow for a PIC to couple to a fiber at both the wafer edge and the wafer surface, thus providing an increased number of fiber inputs and outputs.

An optical switch may be denoted as N×M, where N represents a number of inputs and M represents a number of outputs. N and M are any positive integers and may be the same. A cell is a basic building block of an optical switch. A cell may be denoted as I×J, where I represents a number of cell inputs and J represents a number of cell outputs. I and J are any positive integers and may be the same. For example, a cell may be 1×2, 2×1, or 2×2. A cell may therefore be defined as the smallest physical unit in a switch that has inputs, outputs, and paths connecting the two.

FIG. 1 is a schematic diagram of an optical switch 100. The switch 100 includes input cells 120, an inner architecture 140, and output cells 160. The components of the switch 100 may be arranged as shown or in any other suitable manner. Each input cell 120 includes one first input 110 and two first outputs 130, and may therefore be referred to as a 1×2 cell. Alternatively, each input cell 120 includes two first inputs 110, one of which may be unused, and two first outputs 130. The inner architecture 140 has any configuration of cells and connections among those cells suitable for optical switching. Each output cell 160 includes two second inputs 150 and one second output 170, and may therefore be referred to as a 2×1 cell. Alternatively, each output cell 160 includes two second inputs 150 and two second outputs 170, one of which may be unused.

The switch 100 is referred to as a dilated switch because the input cells 120 are 1×2 cells, the output cells 160 are 2×1 cells, and the inner architecture 140 is any suitable architecture. Dilated switches generally provide good crosstalk suppression. In operation, one of the first inputs 110 receives an optical signal, the switch 100 directs the optical signal to one of the second outputs 170 via the inner architecture 140 based on received instructions, and one of the second outputs 170 outputs the optical signal.

Figure 2:
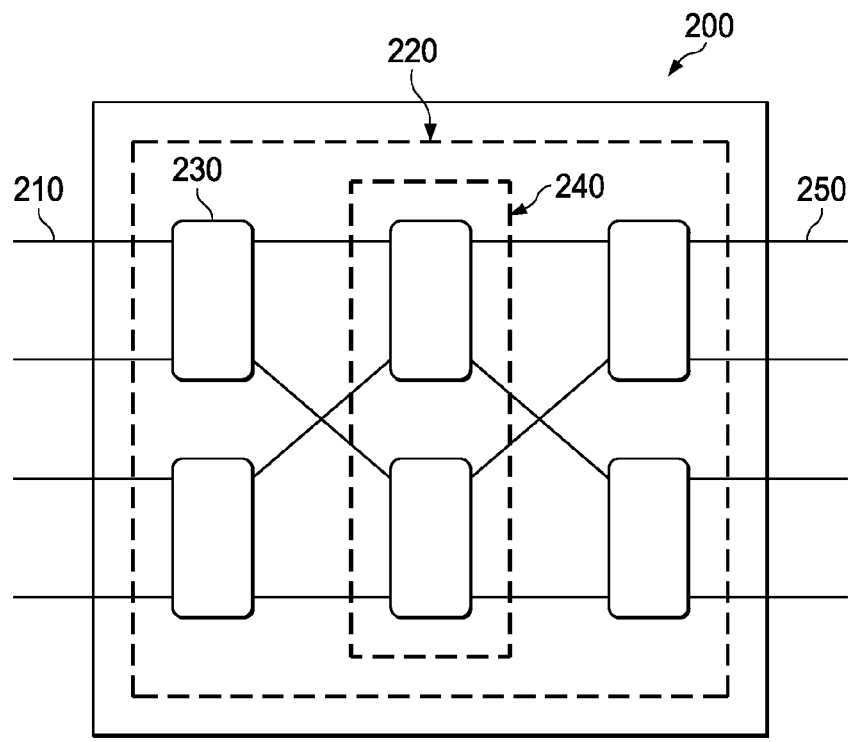
FIG. 2 is a schematic diagram of an optical switch with a Benes network.

FIG. 2 is a schematic diagram of an optical switch 200 with a Benes network. The switch 200 is similar to the switch 100, except the switch 200 has an inner architecture 220 that is different from the inner architecture 140. Specifically, the inner architecture 220 includes cells 230 arranged in the form of a Benes network. A Benes network connects $2^x$ inputs to $2^x$ outputs through $2x-1$ levels of 2×2 switches. Levels are parallel groupings of cells. For the switch 200, x is 2 so that the inner architecture 220 connects $2^2=4$ inputs 210 to $2^2=4$ outputs 250 through $2(2)-1=3$ levels 240. Benes networks are rearrangeable, are non-blocking, and can realize any arbitrary permutation. Blocking occurs when optical signal paths connecting different inputs and outputs overlap.

Figure 3:
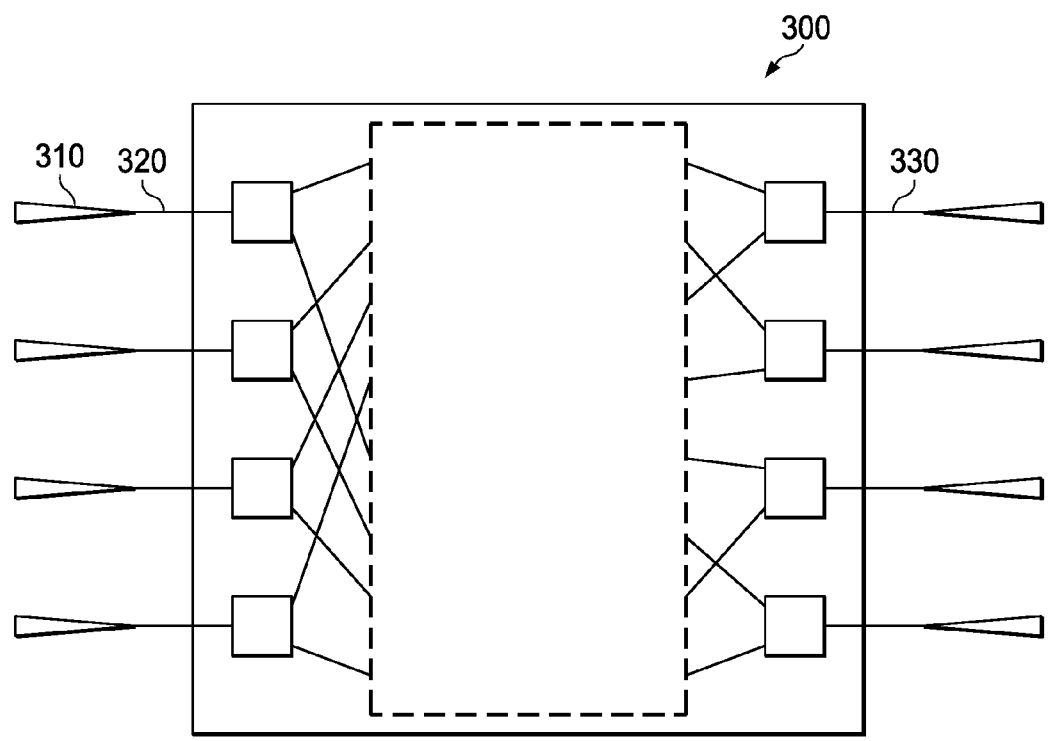
FIG. 3 is a schematic diagram of an optical switch coupled to edge couplers.

FIG. 3 is a schematic diagram of an optical switch 300 coupled to edge couplers 310. The switch 300 is similar to the switch 100, except the switch 300 is coupled to the edge couplers 310. Specifically, both inputs 320 and outputs 330 of the switch 300 are coupled to the edge couplers 310. The edge couplers 310 provide optical coupling to optical fibers and other components (not shown) for testing and implementation purposes. As mentioned above, edge couplers provide the best optical coupling, but can be formed only at the end of fabrication.

Figure 4:
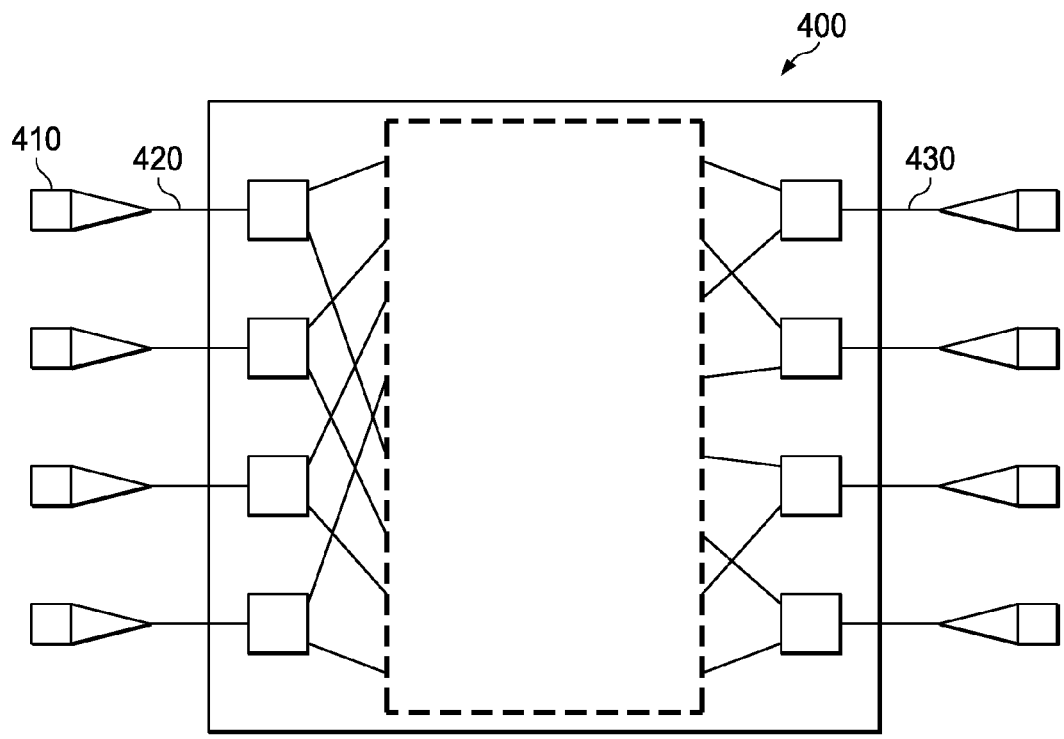
FIG. 4 is a schematic diagram of an optical switch coupled to SGCs.

FIG. 4 is a schematic diagram of an optical switch 400 coupled to SGCs 410. The switch 400 is similar to the switch 300, except the switch 400 is coupled to SGCs 410 instead of the edge couplers 310. Specifically, the SGCs 410 are coupled to both inputs 420 and outputs 430 of the switch 400. The SGCs 410 provide optical coupling to optical fibers and other components (not shown) for testing and implementation purposes. As mentioned above, SGCs may be formed during fabrication, so the switch 400 may be tested using the SGCs 410 during fabrication. Because the SGCs 410 couple to only one input 420, the SGCs 410 are SPSGCs.

Figure 5:
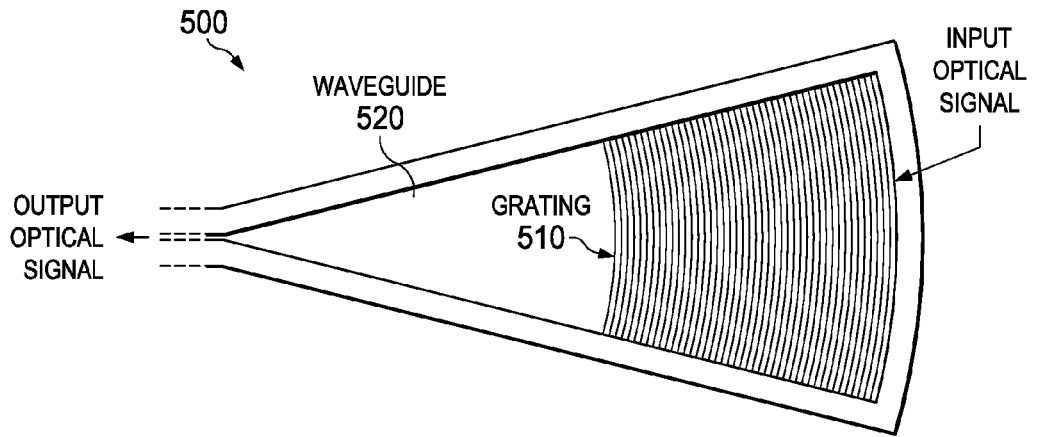
FIG. 5 is a schematic diagram of a single-polarization SGC (SPSGC).

FIG. 5 is a schematic diagram of an SPSGC 500. The SPSGC 500 may be any of the SGCs 410. The SPSGC 500 includes a grating 510 and a waveguide 520. The grating 510 is created by shallow trench isolation (STI) etching and are of various widths. The grating 510 provides scattering centers to couple an input optical signal, which is out-of-plane, to the waveguide 520, which is in-plane. For instance, the input optical signal may contact the SPSGC 500 in a manner perpendicular or approximately perpendicular to the page. The waveguide 520 receives the input optical signal from the grating 510, focuses the input optical signal into a narrower optical signal, and outputs an output optical signal to an optical switch or other component in an in-plane manner. For instance, the output optical signal may travel towards the left of the page.

Figure 6:
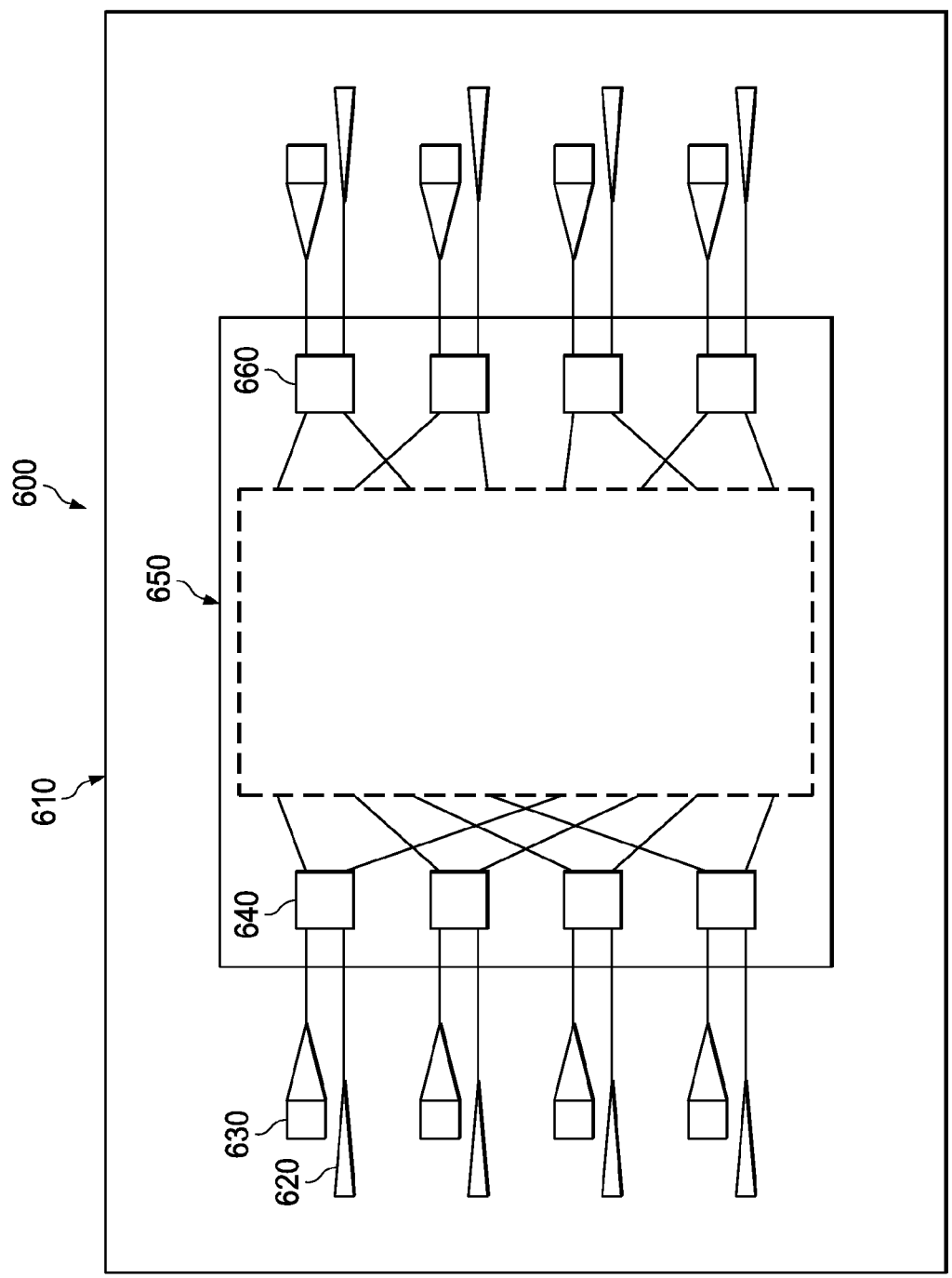
FIG. 6 is a schematic diagram of a PIC coupled to both edge couplers and SGCs according to an embodiment of the disclosure.

FIG. 6 is a schematic diagram of a PIC 600 coupled to both edge couplers 620 and SGCs 630. The PIC 600 includes a chip 610. The chip 610 is a primarily silicon (Si) chip or an SOI chip and includes an optical switch 650. The switch 650 is similar to the switches 300, 400, except the switch 650 is coupled to both edge couplers 620 and SGCs 630. Specifically, both input cells 640 and output cells 660 are coupled to the edge couplers 620, and both the input cells 640 and the output cells 660 are coupled to the SGCs 630. The edge couplers 620 may be formed at the end of the fabrication of the switch 650, so the switch 650 may be tested at the end of fabrication. The SGCs 630 may be formed during fabrication of the switch 650, so the switch 650 may be tested during fabrication. Thus, the switch 650 may be tested during, at the end of, and after fabrication.

Unlike for the switches 100, 300, 400, the input cells 640 are 2×2 cells and the output cells 660 are 2×2 cells in order to accommodate both the edge couplers 620 and the SGCs 630. The input cells 640 may be similar to the 1×2 input cells 120, but include an additional input port, and the output cells 660 may be similar to the 2×1 output cells 160, but include an additional output port. The changes to the input cells 640 and the output cells 660 do not affect the switching function of the switch 650, which functions similarly to the switches 100, 200, 300, 400. The switch 650 may still be considered to have a dilated architecture with additional input cell 640 ports and output cell 660 ports. Because the input cells 120 and the output cells 160 are 2×2 cells within the switch 650, additional splitters or switches are not needed outside the switch 650, but within the PIC 600, thus saving costs.

Figure 7:
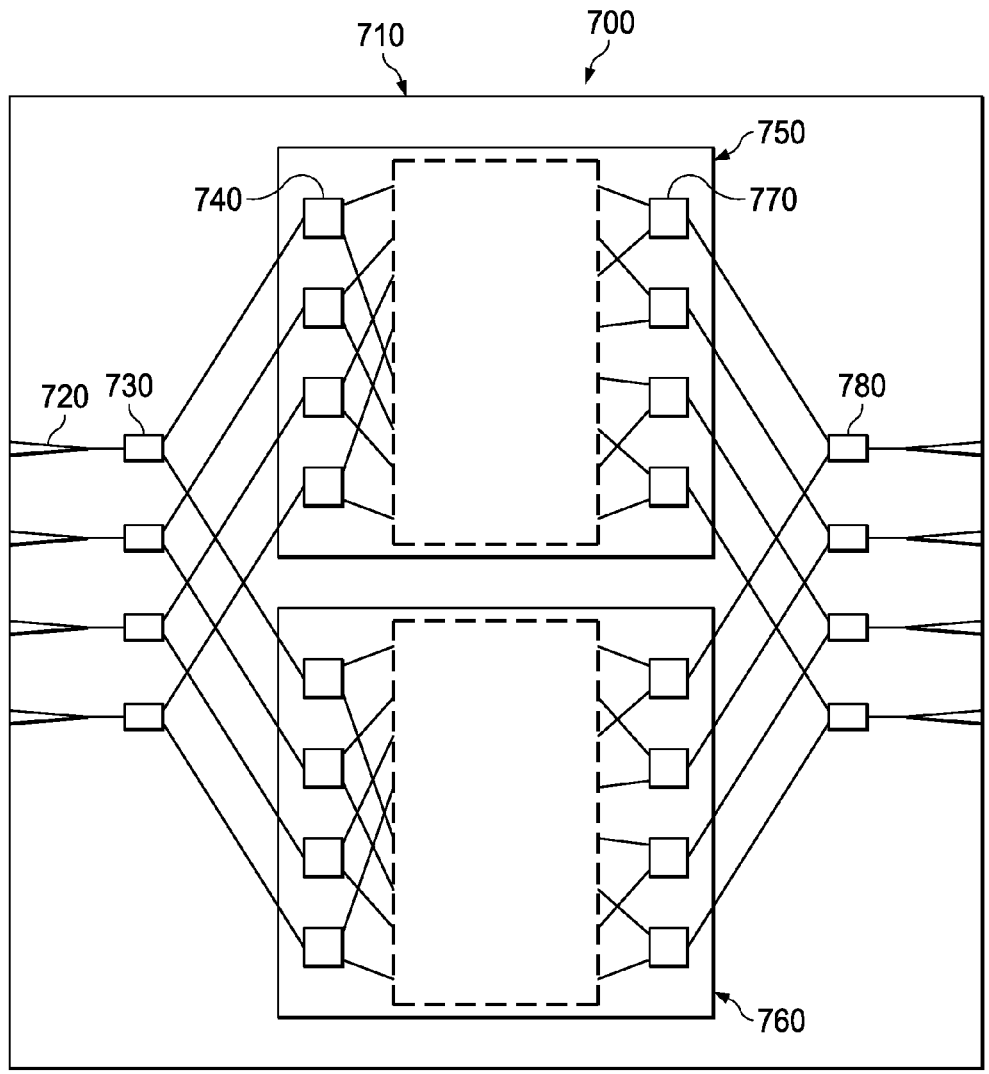
FIG. 7 is a schematic diagram of a polarization-diverse PIC coupled to edge couplers according to an embodiment of the disclosure.

FIG. 7 is a schematic diagram of a polarization-diverse PIC 700 coupled to edge couplers 720. The PIC 700 includes a chip 710. The chip 710 is a primarily silicon chip or an SOI chip and includes a first optical switch 750 and a second optical switch 760. The first switch 750 and the second switch 760 are similar to the switch 300 in that the first switch 750 and the second switch 760 couple to the edge couplers 720. However, unlike the edge couplers 310, which couple to only one input 320, and thus only one input cell, and couple to only one output 330, and thus only one output cell, each edge coupler 720 couples to either two input cells 740 via an input PSR 730 or two output cells 770 via an output PSR 780. Thus, the PIC 700 provides polarization diversity.

In operation, a first edge coupler 720 receives an input optical signal that includes a first component with a first polarization and a second component with a second polarization. The first polarization and the second polarization may be perpendicular or orthogonal to each other. The first component may be referred to as a transverse electric (TE) component, and the second component may be referred to as a transverse magnetic (TM) component. The first edge coupler 720 outputs the input optical signal to an input PSR 730. The input PSR 730 splits the input optical signal into the first component and the second component, outputs the first component to the first switch 750, rotates the second component so that the second component also has the first polarization, and outputs the second component to the second switch 760. The first switch 750 switches the first component and outputs the first component to an output PSR 780, and the second switch 760 switches the second component and outputs the second component to the output PSR 780. The output PSR 780 rotates the second component so that the second component again has the second polarization, combines the first component and the second component to form an output optical signal, and outputs the output optical signal to a second edge coupler 720. Finally, the second edge coupler 720 outputs the output optical signal.

Figure 8:
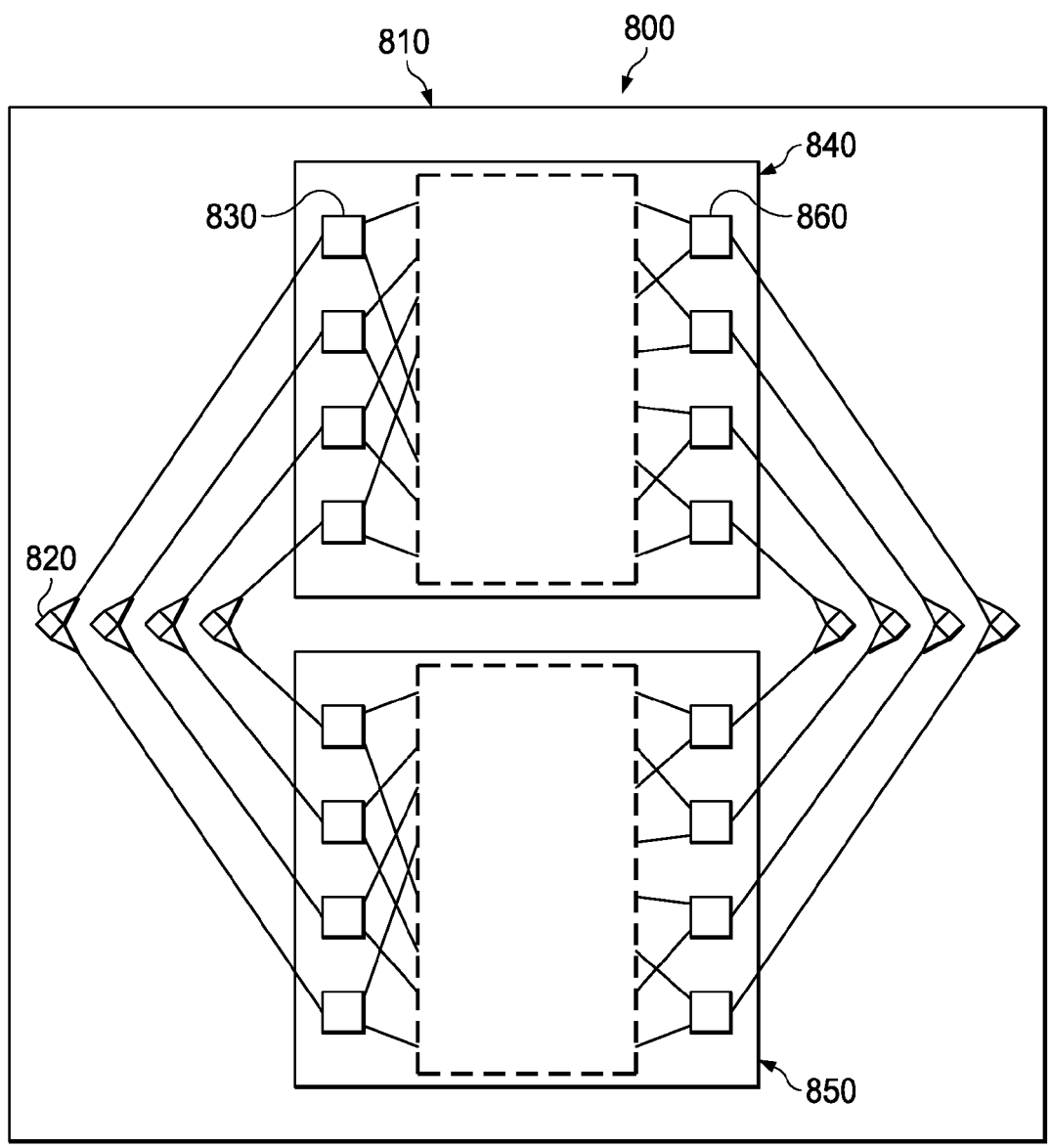
FIG. 8 is a schematic diagram of a polarization-diverse PIC coupled to SGCs according to an embodiment of the disclosure.

FIG. 8 is a schematic diagram of a polarization-diverse PIC 800 coupled to SGCs 820. The PIC 800 includes a chip 810. The chip 810 is a primarily silicon chip or an SOI chip and includes a first optical switch 840 and a second optical switch 850. The first switch 840 and the second switch 850 are similar to the switch 400 in that the first switch 840 and the second switch 850 couple to the SGCs 820. However, unlike the SGCs 410, which couple to only one input 420, and thus only one input cell, and couple to only one output 430, and thus only one output cell, each SGC 820 is a PSSGC that couples to either two input cells 830 or two output cells 860. Thus, the PIC 800 provides polarization diversity.

In operation, a first SGC 820 receives an input optical signal that includes a first component with a first polarization and a second component with a second polarization. The first polarization and the second polarization may be perpendicular or orthogonal to each other. The first component may be referred to as a TE component, and the second component may be referred to as a TM component. The first SGC 820 decomposes the input optical signal so that the first component maintains the first polarization and the second component also has the first polarization. The first SGC 820 outputs the first component to the first switch 840 via a first input cell 830 and outputs the second component to the second switch 850 via a second input cell 830. The first switch 840 switches the first component and outputs the first component to a second SGC 820 via a first output cell 860, and the second switch 760 switches the second component and outputs the second component to the second SGC 820 via a second output cell 860. The second SGC 820 composes the first component and the second component into an output optical signal so that the first component maintains the first polarization and the second component has the second polarization. Finally, the second SGC 820 outputs the output optical signal.

Figure 9:
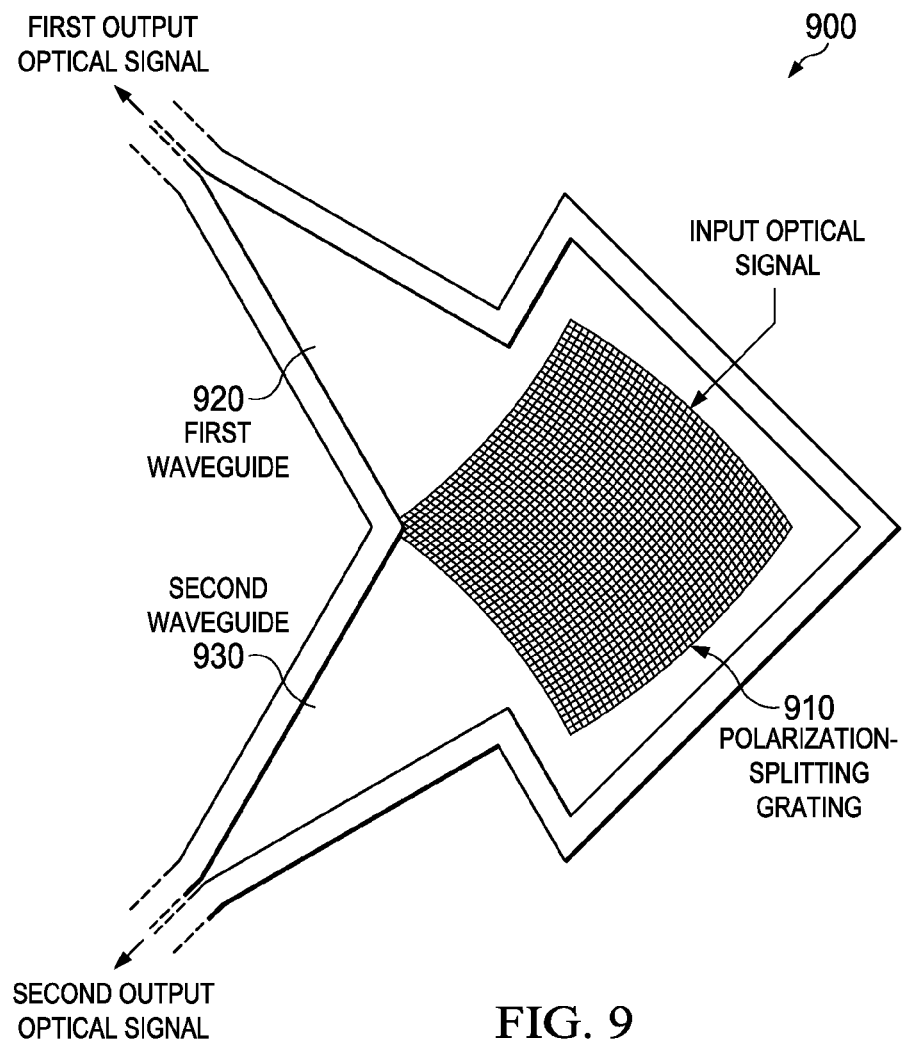
FIG. 9 is a schematic diagram of a polarization-splitting SGC (PSSGC).

FIG. 9 is a schematic diagram of a PSSGC 900. The PSSGC 900 may be any of the SGCs 820. The PSSGC 900 includes a polarization-splitting grating 910, a first waveguide 920, and a second waveguide 930. The PSSGC 900 is similar to the SPSGC 500. However, unlike the grating 510, the grating 910 couples an input optical signal, which is out-of-plane and includes a first component with a first polarization and a second component with a second polarization, and splits the first component and the second component. The first polarization and the second polarization may be perpendicular or orthogonal to each other, the first component may be referred to as a TE component, and the second component may be referred to as a TM component. The grating 910 decomposes the input optical signal so that the first component maintains the first polarization and the second component also has the first polarization. The first waveguide 920 receives the first component from the grating 910, focuses the first component into a narrower component, and outputs a first output optical signal to an optical switch or other component in an in-plane manner. Similarly, the second waveguide 930 receives the second component from the grating 910, focuses the second component into a narrower component, and outputs a second output optical signal to an optical switch or other component in an in-plane manner. The first waveguide 920 and the second waveguide 930, and thus the first output optical signal and the second output optical signal, may exit the PSSGC 900 at a 90-degree angle with respect to each other and along the plane of the page. In addition, the PSSGC 900 may process optical signals in a manner that is reverse to that described above.

Figure 10:
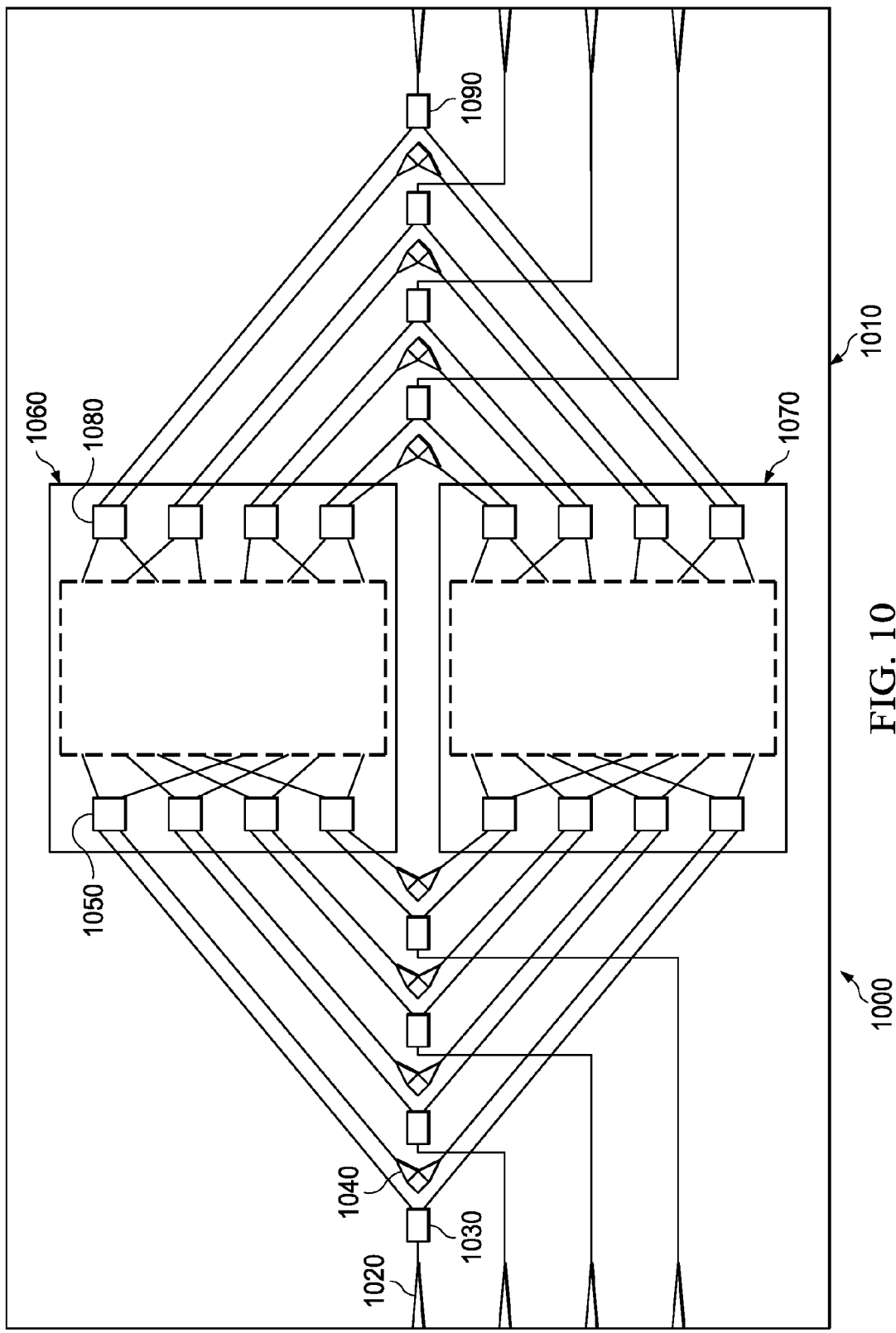
FIG. 10 is a schematic diagram of a polarization-diverse PIC coupled to both edge couplers and SGCs according to an embodiment of the disclosure.

FIG. 10 is a schematic diagram of a polarization-diverse PIC 1000 coupled to both edge couplers 1020 and SGCs. The PIC 1000 includes a chip 1010. The chip 1010 is a primarily silicon chip or an SOI chip and includes a first optical switch 1060 and a second optical switch 1070. The first optical switch 1060 and the second switch 1070 are similar to the switch 600 in that the first switch 1060 and the second switch 1070 couple to both edge couplers 1020 and SGCs 1040. However, unlike the edge couplers 620, which couple to only one input cell 640 and only one output cell 660, each edge coupler 1020 couples to either two input cells 1050 via an input PSR 1030 or two output cells 1080 via an output PSR 1090. In addition, unlike the SGCs 630, which couple to only one input cell 640 and only one output cell 660, each SGC 1040 couples to either two input cells 1050 or two output cells 1080. Thus, the first switch 1060 and the second switch 1070 may be tested during, at the end of, and after fabrication, and the PIC 1000 provides polarization diversity.

The PIC 1000 performs at least two operations. In a first operation, a first edge coupler 1020 receives an input optical signal that includes a first component with a first polarization and a second component with a second polarization. The first polarization and the second polarization may be perpendicular or orthogonal to each other, the first component may be referred to as a TE component, and the second component may be referred to as a TM component. The first edge coupler 1020 outputs the input optical signal to an input PSR 1030. The input PSR 1030 splits the input optical signal into the first component and the second component, outputs the first component to the first switch 1060, rotates the second component so that the second component also has the first polarization, and outputs the second component to the second switch 1070. The first switch 1060 switches the first component and outputs the first component to an output PSR 1090, and the second switch 1070 switches the second component and outputs the second component to the output PSR 1090. The output PSR 1090 rotates the second component so that the second component again has the second polarization, combines the first component and the second component to form an output optical signal, and outputs the output optical signal to a second edge coupler 1020. Finally, the second edge coupler 1020 outputs the output optical signal.

In a second operation, a first SGC 1040 receives an input optical signal that includes a first component with a first polarization and a second component with a second polarization. The first polarization and the second polarization may be perpendicular or orthogonal to each other, the first component may be referred to as a TE component, and the second component may be referred to as a TM component. The first SGC 1040 decomposes the input optical signal so that the first component maintains the first polarization and the second component also has the first polarization. The first SGC 1040 outputs the first component to the first switch 1060 via a first input cell 1050 and outputs the second component to the second switch 1070 via a second input cell 1050. The first switch 1060 switches the first component and outputs the first component to a second SGC 1040 via a first output cell 1080, and the second switch 1070 switches the second component and outputs the second component to the second SGC 1040 via a second output cell 1080. The second SGC 1040 composes the first component and the second component into an output optical signal so that the first component maintains the first polarization and the second component has the second polarization. Finally, the second SGC 1040 outputs the output optical signal.

Figure 11:
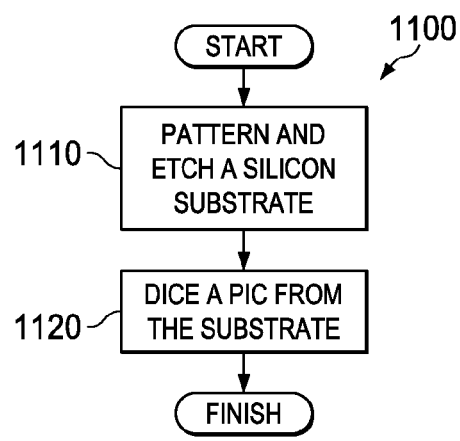
FIG. 11 is a flowchart illustrating a method of switching optical signals according to an embodiment of the disclosure.

FIG. 11 is a flowchart illustrating a method 1100 of fabricating a PIC. The PIC may be one of the PICs 600, 1000. The method 1100 may be completed in order to test the PICs 600, 1000 during, at the end of, or after fabrication.

At step 1110, a silicon substrate is patterned and etched. The substrate is patterned and etched to produce a first optical switch, a first SGC coupled to the first optical switch, and a first edge coupler coupled to the first optical switch. The patterning and etching may also produce a second optical switch attached to the substrate and coupled to the first SGC and the first edge coupler. The patterning and etching may also produce a PSR on the substrate and coupled to the first edge coupler, the first optical switch, and the second optical switch such that the PSR is positioned between the first edge coupler and the first optical switch and between the first edge coupler and the second optical switch. The patterning and etching may also produce a second SGC on the substrate and coupled to the first optical switch and a second edge coupler on the substrate and coupled to the first optical switch. The first SGC and the first edge coupler provide inputs to the first optical switch, and the second SGC and the second edge coupler provide outputs from the first optical switch.

At step 1120, the PIC is diced from the substrate. The PIC comprises the first optical switch, the first SGC, and the first edge coupler. The PIC may also comprise the second optical switch, the PSR switch, the second SGC, and the second edge coupler.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A photonic integrated circuit (PIC) comprising:
   an optical switch, wherein the optical switch is a dilated optical switch;
   a plurality of input edge couplers comprising a first input edge coupler and coupled to the optical switch;
   a plurality of input surface grating couplers (SGCs) comprising a first input SGC and coupled to the optical switch;
   a plurality of output edge couplers comprising a first output edge coupler and coupled to the optical switch; and
   a plurality of output SGCs comprising a first output SGC and coupled to the optical switch.

2. The PIC of claim 1, further comprising a chip, wherein the chip comprises the optical switch, the input edge couplers, the input SGCs, the output edge couplers, and the output SGCs.

3. The PIC of claim 2, wherein the chip primarily comprises silicon.

4. The PIC of claim 2, wherein the chip is a silicon-on-insulator (SOI) chip.

5. The PIC of claim 1, wherein the optical switch comprises a Benes network.

6. A photonic integrated circuit (PIC) comprising:
   an optical switch comprising an input cell and an output cell, wherein the input cell comprises a first input and a second input, and wherein the output cell comprises a first output and a second output;
   a plurality of input edge couplers comprising a first input edge coupler and coupled to the optical switch, wherein the first input is coupled to the first input edge coupler;
   a plurality of input surface grating couplers (SGCs) comprising a first input SGC and coupled to the optical switch, wherein the second input is coupled to the first input SGC;
   a plurality of output edge couplers comprising a first output edge coupler and coupled to the optical switch, wherein the first output is coupled to the first output edge coupler; and
   a plurality of output SGCs comprising a first output SGC and coupled to the optical switch, wherein the second output is coupled to the first output SGC.

7. An apparatus comprising:
   a plurality of input edge couplers;
   a plurality of input surface grating couplers (SGCs);
   a first optical switch coupled to the input edge couplers and the input SGCs and configured to receive from the input edge couplers and the input SGCs first components of input optical signals;
   a second optical switch coupled to the input edge couplers and the input SGCs and configured to receive from the input edge couplers and the input SGCs second components of the input optical signals; and a plurality of input polarization splitter-rotators (PSRs) coupled to the input edge couplers, the first optical switch, and the second optical switch such that the input PSRs are positioned between the input edge couplers and the first optical switch and between the input edge couplers and the second optical switch.

8. The apparatus of claim 7, further comprising a plurality of output edge couplers coupled to the first optical switch and the second optical switch and configured to receive the first components from the first optical switch and the second components from the second optical switch.

9. The apparatus of claim 8, further comprising a plurality of output PSRs coupled to the output edge couplers, the first optical switch, and the second optical switch such that the output PSRs are positioned between the first optical switch and the output edge couplers and between the second optical switch and the output edge couplers.

10. The apparatus of claim 9, further comprising a plurality of output SGCs coupled to the first optical switch and the second optical switch and configured to receive the first components from the first optical switch and the second components from the second optical switch.

11. The apparatus of claim 10, wherein the input SGCs and the output SGCs are polarization-splitting SGCs (PSSGCs).

12. An apparatus comprising:
a plurality of input edge couplers;
a plurality of input surface grating couplers (SGCs);
a first optical switch coupled to the input edge couplers and the input SGCs and configured to receive from the input edge couplers and the input SGCs first components of input optical signals, wherein the first components have a transverse electric (TE) polarization upon entering the input edge couplers and the input SGCs; and
a second optical switch coupled to the input edge couplers and the input SGCs and configured to receive from the input edge couplers and the input SGCs second components of the input optical signals, wherein the second components have a transverse magnetic (TM) polarization upon entering the input edge couplers and the input SGCs.

13. The apparatus of claim 7, wherein the first optical switch is a dilated optical switch, the second optical switch is a dilated optical switch, or both the first optical switch and the second optical switch are dilated optical switches.

14. The apparatus of claim 7, wherein the first optical switch comprises a Benes network, the second optical switch comprises a Benes network, or both the first optical switch and the second optical switch comprise Benes networks.

15. The PIC of claim 1, wherein the input SGCs and the output SGCs are single-polarization SGCs (SPSGCs).

16. The PIC of claim 1, wherein the input SGCs and the output SGCs are polarization-splitting SGCs (PSSGCs).

17. The PIC of claim 1, wherein the input edge couplers, the output edge couplers, or both the input edge couplers and the output edge couplers are configured to couple to optical fibers or other components for testing or implementation purposes.

18. The PIC of claim 1, wherein the input SGCs, the output SGCs, or both the input SGCs and the output SGCs are configured to couple to optical fibers or other components for testing or implementation purposes.

19. The PIC of claim 1, wherein the input SGCs and the output SGCs each comprise a grating and a waveguide, and wherein the grating provides scattering centers to couple an optical signal to the waveguide.

20. The PIC of claim 1, wherein the input SGCs and the output SGCs each comprise a grating, a first waveguide, and a second waveguide, wherein the grating is configured to receive and split an optical signal into a first component and a second component, wherein the first waveguide is configured to focus and output the first component, and wherein the second waveguide is configured to focus and output the second component.

* * * * *